(12) United States Patent
Zhan

(10) Patent No.: US 11,796,092 B2
(45) Date of Patent: Oct. 24, 2023

(54) DOUBLE-WALL SPIRAL WELDED PIPE AND MANUFACTURING METHOD THEREOF

(71) Applicant: NANJING LIANZHONG ENGINEERING TECHNOLOGY CO., LTD, Nanjing (CN)

(72) Inventor: Fujun Zhan, Nanjing (CN)

(73) Assignee: NANJING LIANZHONG ENGINEERING TECHNOLOGY CO., LTD, Nanjing (CN)

(*) Notice: Subject to any disclaimer, the term of this patent is extended or adjusted under 35 U.S.C. 154(b) by 0 days.

(21) Appl. No.: 17/881,030

(22) Filed: Aug. 4, 2022

(65) Prior Publication Data

US 2022/0373109 A1 Nov. 24, 2022

(51) Int. Cl.
*F16L 9/16* (2006.01)
*F16L 9/18* (2006.01)
*B23K 31/02* (2006.01)
*B23K 103/04* (2006.01)

(52) U.S. Cl.
CPC .............. *F16L 9/18* (2013.01); *B23K 31/027* (2013.01); *F16L 9/165* (2013.01); *B23K 2103/04* (2018.08); *F16L 9/16* (2013.01)

(58) Field of Classification Search
CPC ..... F16L 11/20; F16L 9/18; F16L 9/16; F16L 9/165; F16L 11/24; B23K 31/027
USPC .......................... 138/112–114, 129, 144, 154
See application file for complete search history.

(56) References Cited

U.S. PATENT DOCUMENTS

| | | | |
|---|---|---|---|
| 4,129,152 A * | 12/1978 | Davis | F16L 9/06 138/121 |
| 4,509,447 A * | 4/1985 | Smith, Sr. | F16L 9/18 114/65 R |
| 2003/0183293 A1* | 10/2003 | Fraser | B29C 63/10 138/144 |

FOREIGN PATENT DOCUMENTS

| WO | WO-2012090184 A2 * | 7/2012 | ............. B29C 53/78 |
| WO | WO-2012090185 A1 * | 7/2012 | ........... B29C 53/785 |

* cited by examiner

*Primary Examiner* — Patrick F Brinson
(74) *Attorney, Agent, or Firm* — CBM PATENT CONSULTING, LLC

(57) ABSTRACT

A double-wall spiral welded pipe includes a first steel belt layer and a second steel belt layer which have equal widths, are arranged in parallel and align with each other; at least two supporting steel bars perpendicular to the first steel belt layer and the second steel belt layer are arranged between the first steel belt layer and the second steel belt layer; the supporting steel bars are arranged on end parts of two sides of the first steel belt layer and the second steel belt layer and extend together with the first steel belt layer and the second steel belt layer; and the first steel belt layer, the second steel belt layer and the supporting steel bars on the end parts of the two sides are mutually welded to form a double-layer composite steel belt with a rectangular section in an extending direction.

9 Claims, 3 Drawing Sheets

DOUBLE-WALL SPIRAL WELDED PIPE AND MANUFACTURING METHOD THEREOF

CROSS REFERENCES

This application claims priority to Chinese Patent Application Ser. No. CN202110902131.9 filed on 6 Aug. 2021.

FIELD OF TECHNOLOGY

The present invention relates to the technical field of steel pipe welding, and in particular to a double-wall spiral welded pipe and a manufacturing method thereof.

BACKGROUND

At present, most of spiral welded steel pipes have single-layer pipe walls. When the diameter of the steel pipe is required to exceed 2 m, in order to meet the requirement of water pressure in the steel pipe and the requirement of load outside the steel pipe, the thickness of the pipe wall is about 20 mm, and the steel consumption is high; and when the diameter of the steel pipe is required to be about 3 m, the thickness of the steel pipe needs to be about 30 mm. In this case, the steel consumption and the cost are high; for a steel plate with the thickness of 30 mm, the delivery state of a steel mill is a rectangular block-shaped flat plate, which cannot be delivered in the state of a steel coil or steel belt, so the production-line type continuous rolling and continuous welding of the spiral welded pipes cannot be met, the rectangular block-shaped steel plate only can be singly pre-curved and rolled into a cylinder shape, the straight welded seam is welded, short unit-section straight welded pipes are made, and then each unit section is butted and welded, thereby greatly reducing the production efficiency. In addition, the ability of the welded seam of the straight welded pipe to bear internal pressure is weaker than that of the spiral welded pipe, and the wall thickness of the straight welded pipe is generally 10%-25% more than that of the spiral welded pipe, resulting in increased cost. Furthermore, when the diameter of the spiral welded pipe with the single-layer wall reaches about 2.5 m, the ability to bearing the external load is obviously reduced, even when the spiral welded pipe with the single-layer wall is placed in a free state, elliptic deformation will occur under the self-weight of the steel pipe, so it is necessary to arrange a shaped temporary support in the pipe.

SUMMARY

Objectives of the present invention: to overcome the shortcomings in the background art, the first objective of the present invention is to disclose a double-wall spiral welded pipe; and the second objective is to disclose a manufacturing method of the double-wall spiral welded pipe.

Technical solution: the double-wall spiral welded pipe disclosed by the present invention is formed by spiral roll welding of a double-layer composite steel belt, where the double-layer composite steel belt includes a first steel belt layer and a second steel belt layer which have equal widths, are arranged in parallel and align with each other; at least two supporting steel bars perpendicular to the first steel belt layer and the second steel belt layer are arranged between the first steel belt layer and the second steel belt layer; the supporting steel bars are arranged on end parts of two sides of the first steel belt layer and the second steel belt layer and extend together with the first steel belt layer and the second steel belt layer; and the first steel belt layer, the second steel belt layer and the supporting steel bars on the end parts of the two sides are mutually welded to form a double-layer composite steel belt with a rectangular section in an extending direction.

Further, outer sides of the supporting steel bars protrude out of the steel belt layers after the supporting steel bars are arranged on the end parts of the two sides of the first steel belt layer and the second steel belt layer; and during roll welding of the double-layer composite steel belt, the protruded parts of the supporting steel bars on the two sides are spliced to form a welding groove with the steel belt layers.

The contacted supporting steel bars and the adjacent steel belt layers can be welded together through the welding groove, and the pipe wall can be smooth after welding.

Further, a plurality of supporting steel bars are arranged at intervals between the supporting steel bars on the two sides of the steel belt layers to support interiors of the first steel belt layer and the second steel belt layer, and all the supporting steel bars are parallel to each other and extend together.

Further, a plurality of split steel belts are arranged in parallel and welded to form the first steel belt layer, and a joint of the adjacent split steel belts corresponds to one supporting steel bar.

When the welded seam of the adjacent split steel belts is welded, the adjacent split steel belts can be welded together with the corresponding supporting steel bar, so that the adjacent split steel belts and the corresponding supporting steel bar can be fixed, and the structure is more stable.

Meanwhile, since a welded seam is present between the split steel belts, a continuous spiral welded seam is formed when a pipeline is formed by roll welding, and the spiral welded seam is not favorable for water to flow rapidly, so during rolling welding of the double-layer composite steel belt, the first steel belt layer is located on the outer wall of the pipeline, and the spiral welded seam is located on the outer wall of the pipe.

A manufacturing method of the double-wall spiral welded pipe includes the following steps:

S1: releasing a second steel belt from a steel coil, and horizontally placing the second steel belt to form a second steel belt layer;

S2: releasing supporting steel bars from a plurality of vertical steel coils, and placing the supporting steel bars perpendicular to the second steel belt layer, where two of the supporting steel bars are placed on side end parts of the second steel belt layer, and the bottoms of the supporting steel bars are welded with the second steel belt layer;

S3: releasing a first steel belt with the same width as the second steel belt from the steel coil, horizontally placing the first steel belt on the supporting steel bars to form a first steel belt layer, and performing welding and fixing to form a double-layer composite steel belt; and S4: spirally bending and rolling the double-layer composite steel belt by a spiral steel welded pipe processing device, continuously welding welded seams inside and outside a pipe, and continuously forming a steel pipe.

In S2, outer sides of the supporting steel bars placed on the side end parts of the second steel belt layer protrude out of the steel belt layer; and in S4, during rolling, when the steel belt is rolled to complete a circle track and is in contact with an edge of an unrolled steel belt, two welding grooves are formed in the pipe, and the contacted supporting steel bars are welded and fixed with the adjacent steel belt layer through the welding grooves.

Further, the steel belt is continuously rolled from bottom to top; and for the inner and outer welding grooves at the same position, the welding groove in the pipe is welded firstly, the welding groove outside the pipe is welded above the pipeline, and welding and fixing are performed continuously.

Further, in S3, the first steel belt layer includes a plurality of split steel belts arranged in parallel, the split steel belts are released respectively from the steel coil and placed on the supporting steel bars, a joint of the adjacent split steel belts corresponds to one supporting steel bar to form a welded seam, and the adjacent split steel belts and the supporting steel bar are welded and fixed through the welded seams.

Beneficial effects: compared with the prior art, the present invention has the following advantages:
a. the double-wall spiral welded pipe designed by the present invention has high structural strength, and can greatly reduce material consumption and cost on the premise of meeting the external pressure strength and the internal pressure strength of the existing national standard of steel pipes.
b. A welding groove is designed on a welding edge, so that the welding position is more stable; and due to the groove, a pipe wall is smoother after the welding seam is welded, so that pipe jacking construction is facilitated.
c. Since the whole body adopts the split splicing and welding mode, knocked-down transportation can be realized, thereby solving the problems that the steel pipe with the diameter of more than 3 m only can be delivered in a plate-shaped state instead of being delivered in a coiled state due to the excessively thick steel plate material and the spiral welded pipe cannot be produced continuously; and inner and outer layers of steel plates can singly use or all use stainless steel, or use stainless steel composite steel, so the durability of the steel pipe is improved, the life of the steel pipe is greatly prolonged, and the cost is not increased or is only slightly increased.
d. The whole pipe wall is supported by the supporting steel bars, so a cavity between the inner layer and the outer layer can be filled with concrete to enhance the structural strength and prevent internal corrosion.
e. On the premise of achieving the same structural strength, the weight of the pipeline of the present invention and the construction lifting cost are reduced, and the single section may be longer, thereby reducing the welded seams of the pipe sections on the construction site.

DETAILED DESCRIPTION OF THE EMBODIMENTS

The present invention is further described below in detail with reference to the accompanying drawings and specific embodiments.

Figure 1:
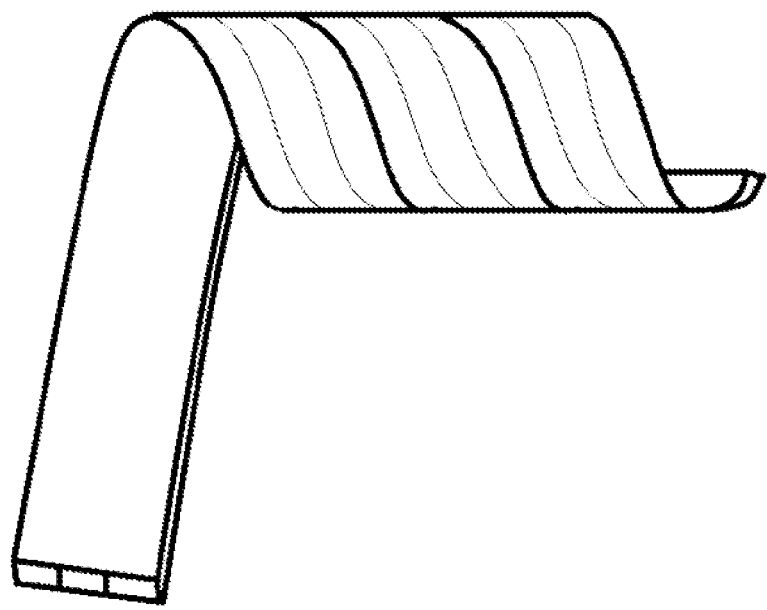
FIG. 1 is a structural schematic diagram of a double-wall spiral welded pipe according to the present invention.

The double-wall spiral welded pipe shown in FIG. 1 is formed by roll welding of a double-layer composite steel belt.

Figure 2:
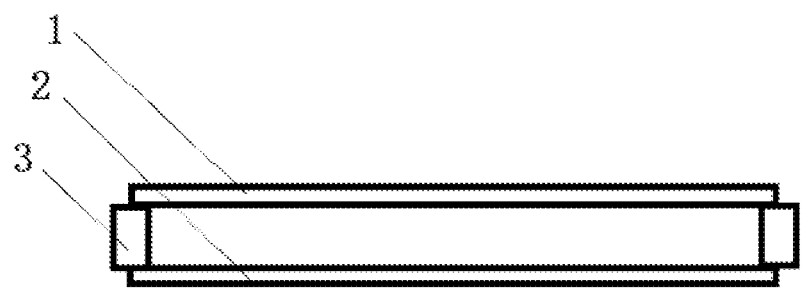
FIG. 2 is a sectional view in an extending direction of a double-layer composite steel according to the present invention.

As shown in FIG. 2, the double-layer composite steel belt includes a first steel belt layer 1 and a second steel belt layer 2 which have equal widths, are arranged in parallel, align with each other and extend together. At least two supporting steel bars 3 perpendicular to the first steel belt layer 1 and the second steel belt layer 2 are arranged between the first steel belt layer 1 and the second steel belt layer 2; the supporting steel bars 3 are arranged on end parts of two sides of the first steel belt layer 1 and the second steel belt layer 2 and extend together with the first steel belt layer 1 and the second steel belt layer 2; during arrangement, outer sides of the supporting steel bars 3 protrude out of the steel belt layers; and the first steel belt layer 1, the second steel belt layer 2 and the supporting steel bars 3 on the end parts of the two sides are mutually welded to form a double-layer composite steel belt with a rectangular section in an extending direction.

Figure 3:
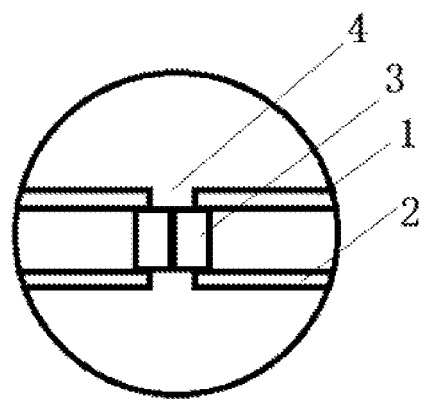
FIG. 3 is a structural diagram of a welding groove according to the present invention.

As shown in FIG. 3, during roll welding of the double-layer composite steel belt, the protruded parts of the supporting steel bars 3 on the two sides are spliced and form a welding groove 4 together with the steel belt layers; and when the welding groove 4 is welded, the two spliced supporting steel bars 3 and the adjacent two steel belt layers are welded and fixed at the same time, and welded seams are flat relative to a pipe wall.

Figure 4:
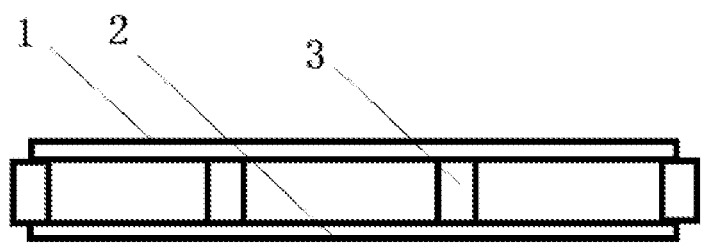
FIG. 4 is a sectional view of a supporting steel bar in a double-layer composite steel according to the present invention.

As shown in FIG. 4, after the supporting steel bars 3 are arranged on the end parts of the two sides of the first steel belt layer 1 and the second steel belt layer 2, two supporting steel bars 3 are arranged at intervals between the supporting steel bars 3 on the two sides to support interiors of the first steel belt layer 1 and the second belt layer 2, and all the supporting steel bars 3 are parallel to each other, extend together and are entirely welded and fixedly.

Figure 5:
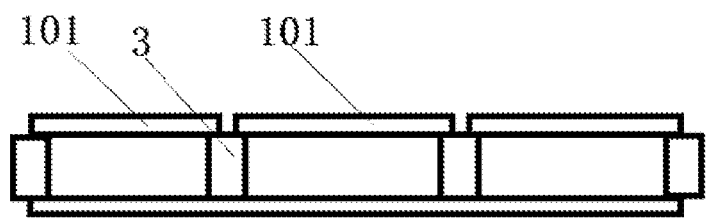
FIG. 5 is a structural diagram of a split steel belt of a double-layer composite steel belt according to the present invention.

As shown in FIG. 5, considering that a plurality of supporting steel bars 3 inside and the steel belt layers are welded inconveniently, the first steel belt layer 1 is designed to be formed by arranging and welding three split steel belts 101 in parallel, and a joint of the adjacent split steel belts 101 corresponds to one supporting steel bar 3. Each adjacent split steel belts 101 and the corresponding supporting steel bar 3 form a welded seam, thereby facilitating welding and fixation of the adjacent split steel belts 101 and the corresponding supporting steel bar 3. In order to avoid the adverse effect on water drainage by the continuous welded seams, during roll welding of the double-layer composite steel belt, the first steel belt layer 1 is located on an outer wall of a pipeline, so that the welded seam is generated on the outer wall of the pipeline.

Figure 6:
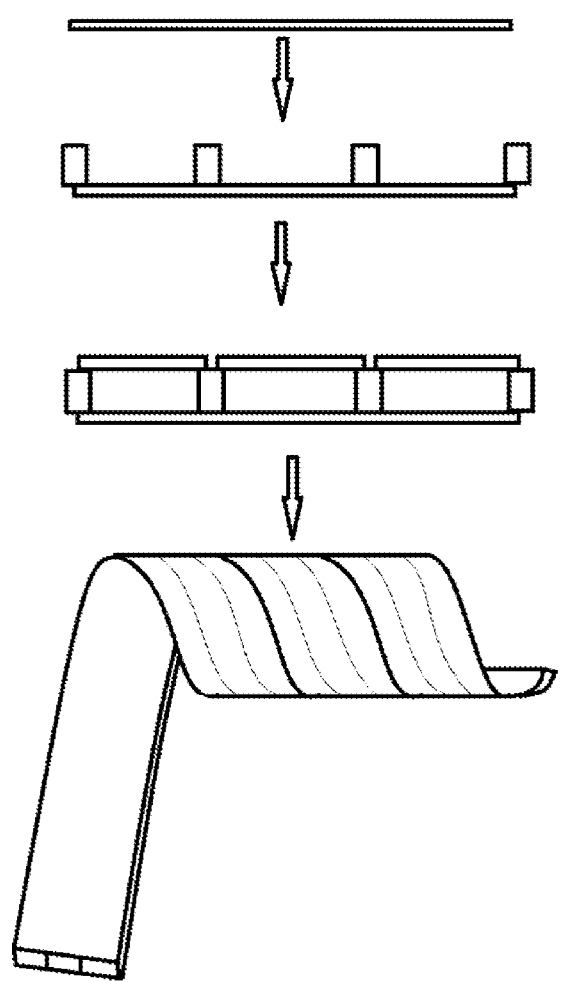
FIG. 6 is a manufacturing flowchart according to the present invention.

As shown in FIG. 6, a manufacturing method of the double-wall spiral welded pipe includes the following steps:
S1: a second steel belt is released from a steel coil, and the second steel belt is horizontally placed to form a second steel belt layer 2;
S2: supporting steel bars 3 are released from four vertical steel coils and placed perpendicular to the second steel belt layer 2, where two of the supporting steel bars 3 are arranged on side end parts of the second steel belt layer 2 and protrude out of the steel belt layer, the other two of the supporting steel bars 3 are placed in the middle part, and the bottoms of the supporting steel bars 3 are welded to the second steel belt layer 2;

S3: a first steel belt with the same width as the second steel belt is released from the steel coil, the first steel belt is horizontally placed on the supporting steel bars 3 corresponding to the second steel belt to form a first steel belt layer 1 which includes three split steel belts 101 arranged in parallel, the three split steel belts 101 are released respectively from the steel coil to be placed on the supporting steel bars 3, a joint of the adjacent split steel belts 101 corresponds to one supporting steel bar 3 to form a welded seam, the adjacent split steel belts 101 and the supporting steel bar 3 are welded and fixed through the welded seam to form a double-layer composite steel belt; and S4: the double-layer composite steel belt is spirally curved and rolled by a spiral steel welded pipe processing device, during rolling, when the first steel belt layer 1 is rolled to complete a circle track and is in contact with an edge of an unrolled steel belt, the supporting steel bars 3 on the two sides are in contact to form welding grooves 4 inside and outside a pipe, the contacted supporting steel bars 3 and the adjacent steel belt layers are welded and fixed through the welding grooves 4, the steel belt is continuously rolled from bottom to top, for the welding grooves 4 inside and outside the same position, the welding groove in the pipe is welded first, the welding groove outside the pipe is welded above the pipeline, welding and fixing are performed continuously, and the steel pipe is continuously formed.

What is claimed is:

1. A double-wall spiral welded pipe, formed by spiral roll welding of a double-layer composite steel belt, wherein the double-layer composite steel belt comprises a first steel belt layer (1) and a second steel belt layer (2) which have equal widths, are arranged in parallel and align with each other; at least two supporting steel bars (3) perpendicular to the first steel belt layer (1) and the second steel belt layer (2) are arranged between the first steel belt layer (1) and the second steel belt layer (2); the supporting steel bars (3) are arranged on end parts of two sides of the first steel belt layer (1) and the second steel belt layer (2) and extend together with the first steel belt layer (1) and the second steel belt layer (2); and the first steel belt layer (1), the second steel belt layer (2) and the supporting steel bars (3) on the end parts of the two sides are mutually welded to form a double-layer composite steel belt with a rectangular section in an extending direction.

2. The double-wall spiral welded pipe according to claim 1, wherein outer sides of the supporting steel bars (3) protrude out of the steel belt layers after the supporting steel bars (3) are arranged on the end parts of the two sides of the first steel belt layer (1) and the second steel belt layer (2); and during roll welding of the double-layer composite steel belt, the protruded parts of the supporting steel bars (3) on the two sides are spliced to form a welding groove (4) with the steel belt layers.

3. The double-wall spiral welded pipe according to claim 1, wherein a plurality of supporting steel bars (3) are arranged at intervals between the supporting steel bars (3) on the two sides of the steel belt layers to support interiors of the first steel belt layer (1) and the second steel belt layer (2), and all the supporting steel bars (3) are parallel to each other and extend together.

4. The double-wall spiral welded pipe according to claim 1, wherein a plurality of split steel belts (101) are arranged in parallel and welded to form the first steel belt layer (1), and a joint of the adjacent split steel belts (101) corresponds to one supporting steel bar (3).

5. The double-wall spiral welded pipe according to claim 4, wherein during roll welding of the double-layer composite steel belt, the first steel belt layer (1) is located on an outer wall of a pipeline.

6. A manufacturing method of the double-wall spiral welded pipe according to claim 1, comprising the following steps:

S1: releasing a second steel belt from a steel coil, and horizontally placing the second steel belt to form a second steel belt layer (2);

S2: releasing supporting steel bars (3) from a plurality of vertical steel coils, and placing the supporting steel bars (3) perpendicular to the second steel belt layer (2), wherein two of the supporting steel bars (3) are placed on side end parts of the second steel belt layer (2), and the bottoms of the supporting steel bars (3) are welded with the second steel belt layer (2);

S3: releasing a first steel belt with the same width as the second steel belt from the steel coil, horizontally placing the first steel belt on the supporting steel bars (3) to form a first steel belt layer (1), and performing welding and fixing to form a double-layer composite steel belt; and S4: spirally bending and rolling the double-layer composite steel belt by a spiral steel welded pipe processing device, continuously welding welded seams inside and outside a pipe, and continuously forming a steel pipe.

7. The manufacturing method of the double-wall spiral welded pipe according to claim 6, wherein in S2, outer sides of the supporting steel bars (3) placed on the side end parts of the second steel belt layer (2) protrude out of the steel belt layer; and in S4, during rolling, when the steel belt is rolled to complete a circle track and is in contact with an edge of an unrolled steel belt, two welding grooves (4) are formed in the pipe, and the contacted supporting steel bars (3) are welded and fixed with the adjacent steel belt layer through the welding grooves (4).

8. The manufacturing method of the double-wall spiral welded pipe according to claim 7, wherein the steel belt is continuously rolled from bottom to top; and for the inner and outer welding grooves (4) at the same position, the welding groove in the pipe is welded firstly, the welding groove outside the pipe is welded above the pipeline, and welding and fixing are performed continuously.

9. The manufacturing method of the double-wall spiral welded pipe according to claim 6, wherein in S3, the first steel belt layer (1) comprises a plurality of split steel belts (101) arranged in parallel, the split steel belts (101) are released respectively from the steel coil and placed on the supporting steel bars (3), a joint of the adjacent split steel belts (101) corresponds to one supporting steel bar (3) to form a welded seam, and the adjacent split steel belts (101) and the supporting steel bar (3) are welded and fixed through the welded seams.

\* \* \* \* \*